United States Patent [19]

Udagawa

[11] Patent Number: 4,826,708
[45] Date of Patent: May 2, 1989

[54] METHOD OF MANUFACTURING A STEEL PLATE WITH A SEAL COATING FOR A STEEL LAMINATE GASKET

[75] Inventor: Tsunekazu Udagawa, Ichikawa, Japan

[73] Assignee: Ishikawa Gasket Co., Ltd., Tokyo, Japan

[21] Appl. No.: 81,211

[22] Filed: Aug. 3, 1987

[51] Int. Cl.[4] .............................................. B05D 5/00
[52] U.S. Cl. ................................... 427/210; 427/265; 427/287; 427/289; 427/293; 427/401; 277/235 B
[58] Field of Search ............... 427/289, 293, 210, 264, 427/265, 287, 401; 277/235 B

[56] References Cited

U.S. PATENT DOCUMENTS 3,477,867  11/1969  Hillier ...................... 277/235 B X
3,770,480  11/1973  Farnam ........................... 427/289 X
4,428,593   1/1984  Pearlstein ...................... 277/235 B Primary Examiner—Evan Lawrence
Attorney, Agent, or Firm—Frank J. Jordan; C. Bruce Hamburg; Manabu Kanesaka

[57] ABSTRACT

A method of manufacturing a steel plate for a steel laminate gasket comprises applying a first seal coating consecutively on at least one side of a base plate in the shape substantially the same as that of an actual steel plate for constituting the gasket. After the first seal coating on the base plate is dried, the base plate is pressed or cut to form a plurality of steel plates. Each steel plate has a configuration as in the actual steel plate, an outer surface formed by the first seal coating on the entire one side thereof and a plurality of holes therein. When a steel laminate gasket is formed, the steel plate with the seal coating thereon is stacked with other steel plates so that the seal coating is located between the two steel plates.

14 Claims, 1 Drawing Sheet

METHOD OF MANUFACTURING A STEEL PLATE WITH A SEAL COATING FOR A STEEL LAMINATE GASKET

BACKGROUND OF THE INVENTION AND RELATED ART STATEMENT

The present invention relates to a method of manufacturing a steel plate with a seal coating for a steel laminate gasket. Further, the present invention disclosed a method of manufacturing a steel laminate gasket with a seal coating between steel plates.

A steel laminate gasket is formed of a plurality of steel plates stacked one after another. In one of a steel laminate type cylinder head gasket, for example, sealing means is provided around cylinder bores and holes for oil and water of the gasket to seal around the bores and holes, while in some of a steel laminate type cylinder head gasket, a plurality of steel plates is simply stacked together without using any sealing means around the cylinder bores and holes for oil and water.

The steel laminate gasket is situated between two engine parts and is tightened strongly in use. However, if sealing means is not provided around the cylinder bores and holes for oil and water, fluid may leak therefrom by passing between the steel plates. Especially, since tightening pressure around the holes for oil and water is not strong, water and oil are liable to leak around the holes for oil and water. Namely, the gasket can not provide sufficient sealing, and leakage causes corrosion of a gasket.

In order to prevent leakage around water and oil holes, it was proposed that a seal coating is formed between two steel plates. The seal coating may be provided on one of two steel plates facing with each other or both sides of the steel plates. The seal coating must be even in thickness to properly seal between the two steel plates.

One method of forming a steel plate with a seal coating is that a seal coating is formed on one or both entire sides of a base plate, and then the base plate is pressed or cut to thereby form a complete steel plate. In this method, the seal coating material is applied on the entire surface of the base plate. Namely, the seal coating is applied onto an area of the base plate which is not used for a steel plate of a gasket. In some situations, about 50% of the base plate is used for the steel plates of a gasket, and the rest of the base plate is discarded. Since the coating material is expensive, the method of coating the coating material on the entire surface of the base plate is costly.

Another method of forming a steel plate with a seal coating is that a base plate is, at first, cut into the actual configuration of the steel plate, and the coating is applied thereon. In case the steel plate is formed by cutting the base plate, the steel plate is slightly deformed. Therefore, it is very difficult to coat the coating material with even thickness. Further, the coating material is liable to accumulate around edge portions of the steel plate. As a result, it is very difficult to apply onto the steel plate a seal coating with even thickness.

Accordingly, one object of the present invention is to provide a method of manufacturing a steel plate with a seal coating, wherein a seal coating can be formed on a steel plate with a minimum amount of a coating material.

Another object of the invention is to provide a method of manufacturing a steel plate as stated above, wherein a seal coating can be evenly applied onto a steel plate.

A further object of the invention is to provide a method of manufacturing a steel laminate gasket with a seal coating between steel plates, which can be easily and economically made.

A still further object of the invention is to provide a method of manufacturing a steel laminate gasket as stated above, wherein the sealing ability of the gasket is excellent.

Further objects and advantages of the invention will be apparent from the following description of the invention.

SUMMARY OF THE INVENTION

In accordance with the present invention, a method of manufacturing a steel plate for a steel laminate gasket is disclosed. In this method, at first, a first seal coating is applied onto at least one side of a base plate in the shape substantially the same as that of an actual steel plate. After the first seal coating is dried, the base plate is pressed or cut to form a plurality of steel plates. Each steel plate is provided with a configuration as in an actual steel plate, an outer surface formed by the first seal coating on the entire one side thereof and a plurality of holes therein.

After the first seal coating is dried, a second seal coating may be applied onto the first seal coating at a selected area. Thereafter, the second seal coating is dried. Preferably, the second seal coating is formed around holes for water and oil. Also, the second seal coating is formed adjacent to an outer periphery of the gasket. In case the second seal coating is formed around the holes for water and oil, the area around the holes for water and oil can be securely sealed. Alternatively, the second seal coating is applied onto the base plate prior to the first seal coating. After the second seal coating is dried, the first seal coating is applied onto the base plate over the second seal coating.

When a steel laminate gasket is formed, the steel plate with the seal coating thereon is assembled with other steel plates so that the seal coating is located between the two steel plates. The steel plates may be connected together by spot welding. Since the seal coating is situated between the adjacent two steel plates, leakage of liquid between the two steel plates is substantially prevented.

DETAILED DESCRIPTION OF PREFERRED EMBODIMENTS

Figure 1:
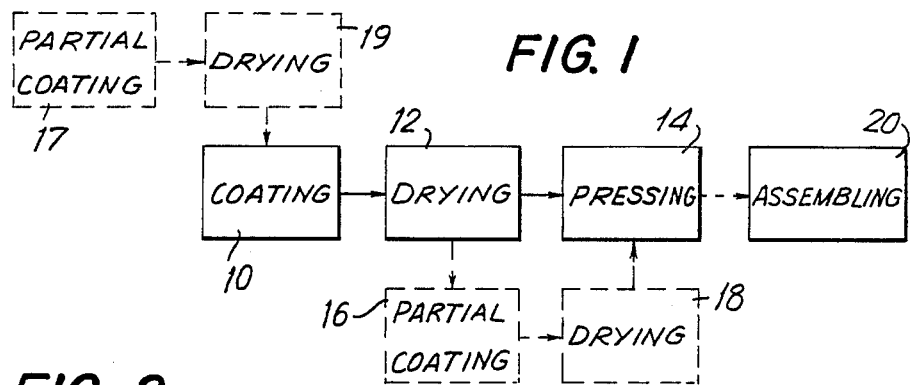
FIG. 1 is a block diagram for showing a method of manufacturing a steel plate for a steel laminate gasket of the present invention.

Referring to FIG. 1, a method of manufacturing a steel plate with a seal coating and a method of manufacturing a steel laminate gasket using the steel plate with a seal coating are shown in a block diagram.

When a steel plate with a seal coating thereon is manufactured, a seal coating in the shape slightly larger than or substantially the same as that of the actual steel plate is applied onto a base plate at a coating section 10. Then, the coating on the base plate is dried at a dry section 12. Finally, the base plate is pressed or cut at a press section 14 to form a steel plate with accurate configuration and size.

When a second or partial coating is further applied onto the seal coating, a partial coating is made at a coating section 16. The partial coating is dried at a dry section 18. Finally, the base plate with two coatings thereon is cut at the press section 14 to form a steel plate.

Alternatively, the partial coating is, at first, formed on the base plate at a coating section 17, and then dried at a drying section 19. Thereafter, a coating is applied on the base plate over the partial coating at the coating section 10. After drying the coating, the base plate is cut at the press section 14.

In case a steel laminate gasket is formed, the steel plate with the seal coating theron is assembled with other steel plates at an assembly section 20. At the assembly section 20, the steel plates are stacked together so that the seal coating is situated between the two plates. As a result, when the gasket is used, fluid does not penetrate into a space between the two plates.

Figure 2:
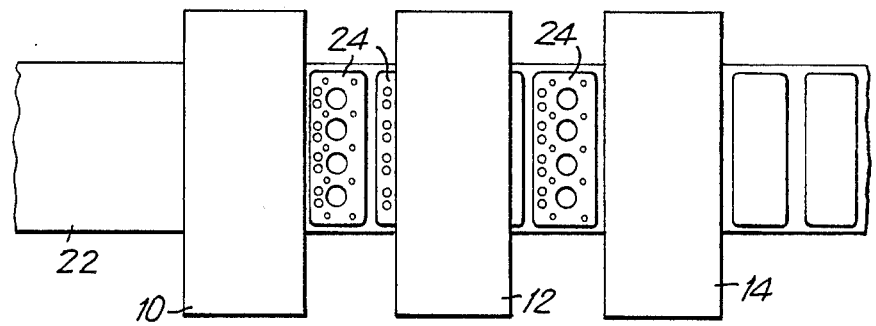
FIG. 2 is an explanatory plan view for showing a method of manufacturing a steel plate.

FIG. 2 shows a line for continuously manufacturing steel plates with seal coatings thereon. As shown in FIG. 2, a base plate 22 is in the elongated rectangular form, wherein the property of the base plate is selected based on requirement of the gasket.

At the coating section 10, a seal coating 24 is continuously applied onto the base plate 22. The seal coating 24 applied at the coating section 10 is in the shape slightly larger than the shape of the actual steel plate for constituting a steel laminate gasket. The seal coating 24 is not formed on portions for constituting bore and hole portions, i.e. cylinder bores and holes for water and oil, of the actual steel plate.

The seal coating 24 must have heat-resistance and oil-resistance properties and fluidity when the seal coating 24 is applied onto the base plate. Further, the seal coating must be congenial to a metal plate. The seal coating 24 may be fluorocarbon polymer, fluorine-containing rubber, silicone polymer, silicone gum, chloroprene rubber, nitrile rubber or chlorosulfonated polyethylene.

The seal coating 24 must be applied onto the base plate 22 evenly and consecutively at the coating section 10. Preferably, the seal coating 24 is formed by a screen printing. Other methods, or a combination thereof, such as an electronic printing or a transfer printing, may be utilized. The thickness of the seal coating 24 is selected based on the sealing condition, generally 5-200 micra.

After the seal coating 24 is imprinted onto the base plate 22, the base plate 22 is heated to dry the seal coating 24 at the dry section 12. The seal coating 24 is adhered onto the base plate 22.

The base plate 22 with the seal coating 24 is cut by a press at the press section 14. Since the seal coating formed on the base plate 22 is slightly larger than the actual configuration of the steel plate for constituting the gasket, when the base plate is cut into the actual size, the seal coating is evenly coated throughout the entire one side of the steel plate.

Figure 3:
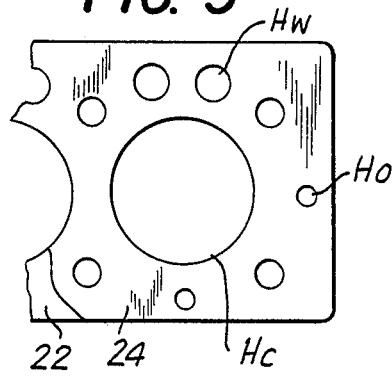
FIG. 3 is an enlarged plan view for showing a part of a steel plate with a first seal coating.

Cylinder bores Hc, water holes Hw, oil holes Ho and so on, may be formed at the same time of cutting the outer configuration of the steel plate at the press section 14. However, after the outer configuration of the actual steel plate is cut at the press section 14, the bores Hc and holes Hw and Ho may be formed on the steel plate. The seal coating 24 must be evenly coated throughout the entire one side of the actual steel plate as shown in FIG. 3.

In case the seal coating 24 is formed on both sides of the base plate 22, after the seal coating 24 is formed and dried on one side of the base plate 22, the seal coating 24 is applied on the reverse side of the base plate 22 and dried. The seal coatings 24 on both sides of the base plate 22 must exactly conform to each other.

Figure 4:
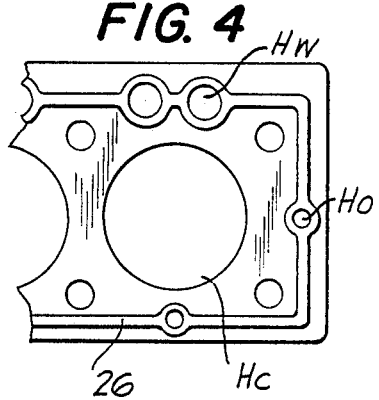
FIG. 4 is an enlarged plan view for showing a part of a steel plate with first and second seal coatings.

When the second or partial coating 26 (FIG. 4) is formed on the seal coating 24, after the seal coating 24 is formed and dried, the partial coating 26 is applied onto the seal coating 24 and dried. The partial coating 26 is formed around the water holes Hw and oil holes Ho and along the outer periphery of the steel plate. Namely, the partial coating 26 is formed at portions requiring additional sealing pressure. As a result, it is possible to properly seal around the water holes and oil holes. Alternatively, after the partial coating 26 is formed, the seal coating 24 may be formed.

Figure 5:
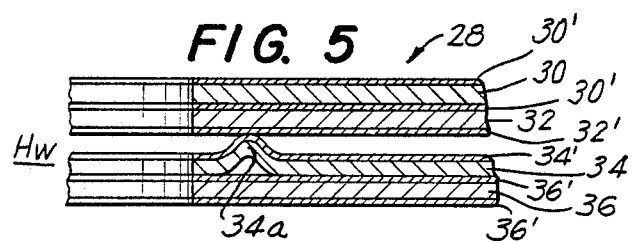
FIG. 5 is an explanatory section view of a part of a steel laminate gasket with seal coatings between steel plates.

FIG. 5 shows a partial section view of a steel laminate gasket 28 using the steel plates with the seal coatings 24 thereon. The gasket 28 comprises outer plates 30, 36, an inner plate 32 and an inner plate 34 with a bead 34a around the water hole Hw. The outer plates 30, 36 are provided with seal coatings 30', 36' on both sides of the respective plates, while the plates 32, 34 are provided with seal coatings 32', 34' on one side of the respective plates. The plates 30, 32, 34, 36 are stacked together so that the seal coatings are situated between the adjacent two plates respectively. The plates may be connected together by spot welding.

Since the gasket 28 is provided with seal coatings between the respective two plates as well as the bead 34a, it is possible to securely seal around the water hole Hw without using special sealing means.

In accordance with the present invention, the seal coating having a configuration similar to the configuration of the actual steel plate for constituting a gasket is printed on a base plate. After the seal coating is dried, the base plate is cut into the actual size of the steel plate for a gasket. Therefore, a necessary amount of coating material is only used in the present invention. Since the coating material is expensive, the present method is very economical. Further, in the present invention, it is possible to provide the seal coating with even thickness.

While the present invention has been explained with reference to the specific embodiments of the invention, the explanation is illustrative and the invention is limited only by the appended claims.

What is claimed is:

1. A method of manufacturing a steel plate for a steel laminate gasket, comprising:
   applying a first seal coating consecutively on at least one side of a base plate, said first seal coating having an outer configuration and a plurality of hole portions therein, which substantially correspond to an outer configuration and holes of an actual steel plate for constituting the gasket, respectively,
   drying the first seal coating on the base plate, and
   cutting the base plate along the outer configuration and holes of the actual steel plate to form a plurality of steel plates for constituting the gasket, each steel plate having the first seal coating on the entire outer surface thereof so that the first seal coating is even in thickness without being deposited inside the holes.

2. A method of manufacturing a steel plate according to claim 1, further comprising after drying the first seal coating, applying a second seal coating on the first seal coating at a selected area and drying the second seal coating.

3. A method of manufacturing a steel plate according to claim 2, wherein said second coating is formed around liquid holes and adjacent to an outer periphery of the gasket.

4. A method of manufacturing a steel plate according to claim 3, wherein said first seal coating is formed in the range between 5-200 micra.

5. A method of manufacturing a steel plate according to claim 1, further comprising before applying the first seal coating, applying a second seal coating at a selected area on the base plate and drying the second seal coating.

6. A method of manufacturing a steel plate according to claim 5, wherein said second seal coating is formed around liquid holes and adjacent to an outer periphery of the gasket, said first seal coating being applied on the same side as the second seal coating.

7. A method of manufacturing a steel laminate gasket with seal coating between steel plates, comprising:

applying a first seal coating consecutively on at least one side of a base plate, said first seal coating having an outer configuration and a plurality of hole portions therein, which substantially correspond to an outer configuration and holes of an actual steel plate for constituting the gasket, respectively, drying the first seal coating on the base plate, cutting the base plate along the outer configuration and holes of the actual steel plate to form a plurality of steel plates for constituting the gasket, each steel plate having the first seal coating on the entire outer surface thereof so that the first seal coating is even in thickness without being deposited inside the holes, and assembling the steel plate with at least another steel plate so that the first seal coating is located between the adjacent two steel plates.

8. A method of manufacturing a steel laminate gasket according to claim 7, wherein said first seal coating is formed in the range between 5-200 micra.

9. A method of manufacturing a steel laminate gasket according to claim 8, wherein said first seal coating is formed by a material selected from the group consisting of fluorocarbon polymer, fluorine-containing rubber, silicone polymer, silicone gum, chloroprene rubber, nitrile rubber, and chlorosulfonated polyethylene.

10. A method of manufacturing a steel laminate gasket according to claim 9, wherein said seal coating is formed on the base plate by at least one member selected from the group consisting of screen printing, electronic printing and transfer printing.

11. A method of manufacturing a steel laminate gasket according to claim 7, further comprising after drying the first seal coating, applying a second seal coating on the first seal coating at a selected area and drying the second seal coating.

12. A method of manufacturing a steel laminate gasket according to claim 11, wherein said second seal coating is formed around liquid holes and adjacent to an outer periphery of the gasket.

13. A method of manufacturing a steel laminate gasket according to claim 7, further comprising before applying the first seal coating, applying a second seal coating at a selected area on the base plate and drying the second seal coating.

14. A method of manufacturing a steel laminate gasket according to claim 13, wherein said second seal coating is formed around liquid holes and adjacent to an outer periphery of the gasket, said first seal coating being applied on the same side as the second seal coating.

* * * * *